Oct. 17, 1950 S. MANDL 2,525,922
ROTARY-RECIPROCATING MOTION CONVERTER
Filed May 5, 1945 2 Sheets-Sheet 1
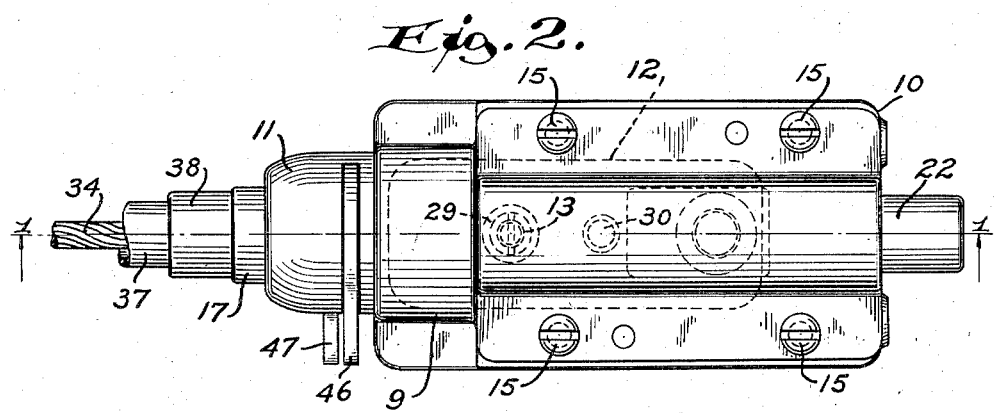
Fig. 2.
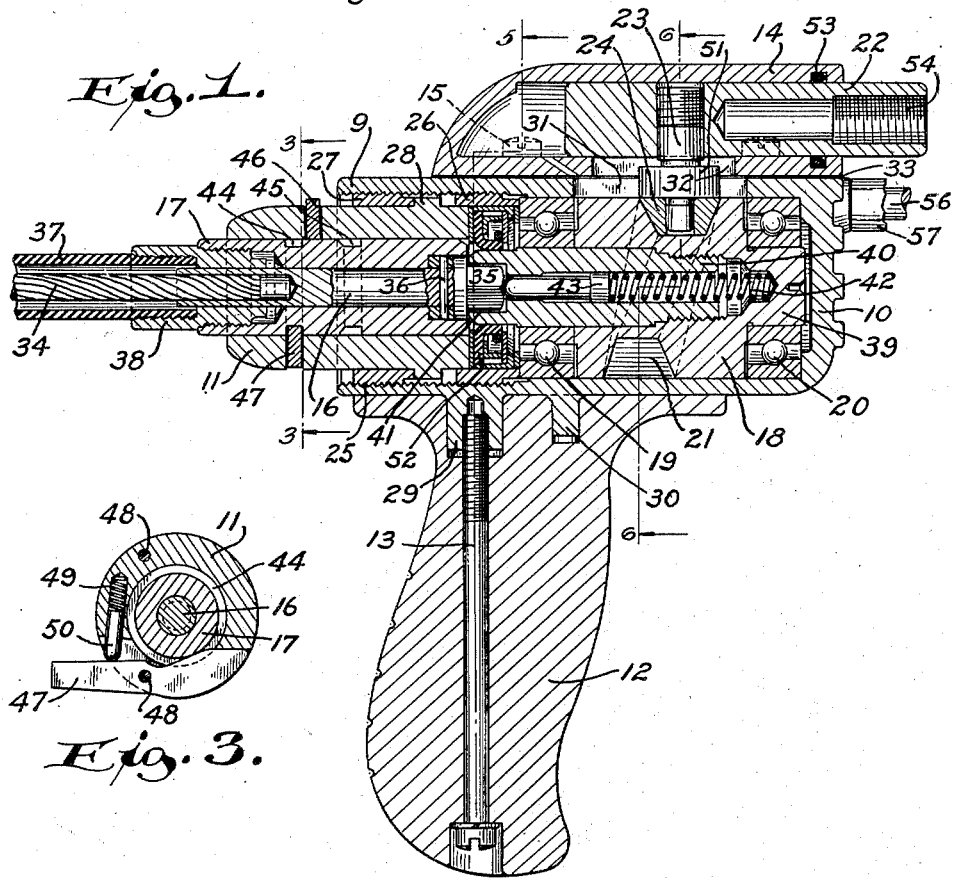
Fig. 1.
Fig. 3.
INVENTOR.
Siegmund Mandl
BY
Lieber & Lieber
ATTORNEYS.

Oct. 17, 1950 — S. MANDL — 2,525,922
ROTARY-RECIPROCATING MOTION CONVERTER
Filed May 5, 1945 — 2 Sheets-Sheet 2

INVENTOR.
Siegmund Mandl
BY Lieber & Lieber
ATTORNEYS.

Patented Oct. 17, 1950

2,525,922

UNITED STATES PATENT OFFICE 2,525,922

ROTARY-RECIPROCATING MOTION CONVERTER

Siegmund Mandl, Milwaukee, Wis., assignor to Blackhawk Mfg. Co., Milwaukee, Wis., a corporation of Wisconsin Application May 5, 1945, Serial No. 592,123

4 Claims. (Cl. 74—57)

This invention relates in general to improvements in mechanism for converting motion from one form into another, and relates more particularly to improvements in the construction and operation of a converter for transforming rotary motion of a driving member into reciprocating motion of a driven tool carrying or work performing element.

The primary object of my invention is to provide an improved motion transmitting unit of simple and compact construction, which is especially adapted to effectively convert rotary motion into uniform reciprocating movement, and to impart the reciprocating motion to a working tool or implement.

It has long been desirable in various industries to have available a portable and relatively powerful but compact unit adapted to be driven from a rotary power source, and to interchangeably actuate the diverse reciprocable tools carried and manipulable by the unit. While numerous types of fluid pressure operated mechanisms for producing reciprocation of tools associated with manually manipulable pistol grip units or the like, have heretofore been proposed and used for various purposes, these prior devices are either too complicated and costly, unreliable in operation, too cumbersome to handle, not sufficiently powerful, very annoying to the operator, or they require the provision of bulky and expensive power generating pumps or compressors. In order to permit convenient and free use of such a reciprocable tool actuating assemblage, the unit must be as light and durable as possible, it must not be subject to easy stalling or interruption in operation, its operation should be smooth and devoid of undesirable jarring and vibration, it should also be well balanced and universally movable so as to permit working in cramped quarters and corners, and it must be compact but powerful. It is also preferable to drive a unit of this type with the aid of an electric or a fluid actuated rotary motor either from a remote station through a flexible propelling shaft, or directly by mounting the motor upon the portable assemblage, and none of the prior power transmitting and motion converting devices have embodied all of these desirable features.

It is therefore a more specific object of the present invention to provide an improved portable power transmitting and motion converting assembly, which incorporates all of the above mentioned desirable features, and which may be effectively employed to interchangeably drive a large variety of reciprocable tools or implements.

Another specific object of this invention is to provide an improved motion converter and power transmitter especially adapted to transform high speed rotary motion into rapid and uniform reciprocating movement capable of being directly applied to perform various kinds of work.

A further specific object of the invention is to provide an improved portable and universally movable unit for converting rotary motion into reciprocating movement, which is adapted to most effectively cooperate with many different types of reciprocable cutting and abrading tools by enabling manipulation of the unit in corners and in cramped quarters.

Still another specific object of my invention is to provide a compact, light, and powerful pistol grip power applying assemblage which is conveniently manipulable by either hand of an operator, and wherein the positioning handle is so located relative to the drive and power take-off as to provide an unobstructed view of the work while also insuring smooth functioning devoid of annoying vibration.

An additional specific object of this invention is to provide an improved simple but highly efficient mechanism for constantly converting rotary motion of a driving member into uniform reciprocating movement of a driven element, all movable parts of which are normally thoroughly concealed and protected while being conveniently accessible for inspection.

Another specific object of the invention is to provide a reliable motion transmitting and converting unit which may be readily assembled and dismantled and which may also be manufactured at moderate cost for diverse uses.

These and other objects and advantages of the present invention will be apparent from the following description; and some of the novel features of motion transmitting mechanisms, shown but not specifically claimed herein, constitute the subject-matter of other applications.

A clear conception of the several features constituting this invention, and of the mode of constructing and of utilizing motion converters embodying the present improvement, may be had by referring to the drawings accompanying and forming a part of this specification wherein like reference characters designate the same or similar parts in the various views.

Fig. 1 is a central longitudinal vertical section through one of my improved portable pistol grip motion converting units for transforming rotary motion of a driving member into uniform reciprocation of a tool carrying driven element, the section being taken on the line 1—1 of Fig. 2;

Fig. 2 is a top view of the assemblage shown in section in Fig. 1;

Fig. 3 is a transverse vertical section through the same unit, taken along the line 3—3 of Fig. 1;

Figure 4:
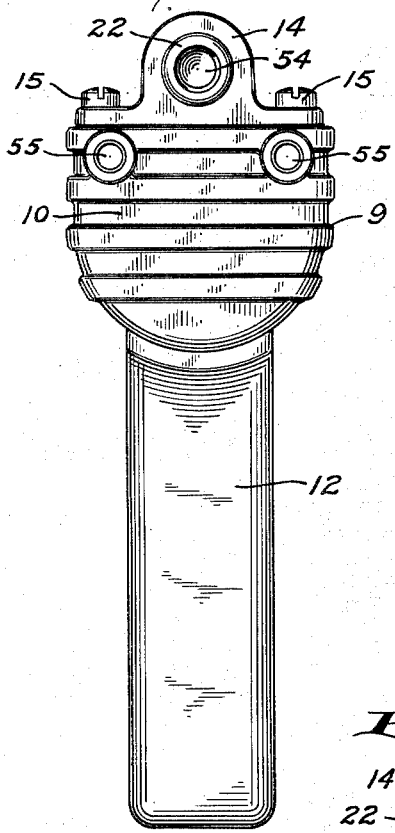
Fig. 4 is an end view of the converter assemblage looking toward the tool supporting end of the reciprocable driven element.
Figure 5:
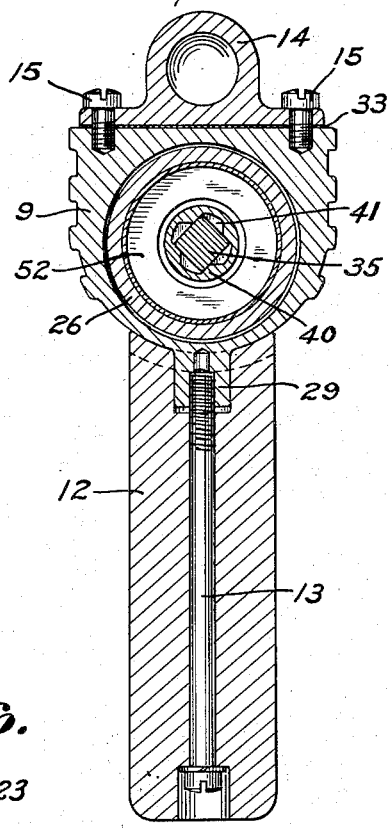
Fig. 5 is a transverse vertical section through the unit, taken along the irregular line 5—5 of Fig. 1.

Although the invention has been embodied in a portable pistol grip unit for converting the rotary motion of a flexible shaft into reciprocating movement of a tool carrying element mounted on the unit, it is not my desire or intent to thereby unnecessarily restrict the utility of some of the features which may be more generally applied to converter assemblages driven by either electric or fluid pressure actuated motors or from other sources of rotary motion, located remotely from the portable assemblage or mounted directly thereon.

Referring to the drawings, the improved portable motion converting unit shown therein by way of illustration, comprises in general a hollow main casing 9 having one end sealed by an integral wall 10 while its opposite end is partially sealed by a removable closure plug 11 disposed in axial alinement with the casing bore; a pistol grip handle 12 firmly secured to one side of the casing 9 by a bolt 13; a guide 14 firmly secured to the opposite side of the casing 9 by cap screws 15 and being disposed parallel to the longitudinal casing axis and bore; a rotary driving member 16 journalled in a bearing sleeve 17 which is slidable and rotatably adjustable within the longitudinal central bore of the closure plug 11; a driven member 18 journalled for rotation by the driving member 16 in spaced anti-friction bearings 19, 20 confined within the casing bore, and having an annular peripheral tapered groove 21 lying in a plane inclined relative to the common casing and member axis; a reciprocable tool or implement carrying element 22 slidably confined within the guide 14 and having a laterally projecting rigid pin 23 extending into the groove 21 of the driven member 18; and a tapered roller 24 journalled for rotation upon the protruding end of the pin 23 and snugly coacting with the oppositely inclined side faces of the groove 21.

The main casing 9 is preferably formed of light but durable material, and the rear open end of the central casing bore is provided with internal screw threads 25 with which inner and outer threaded bushings 26, 27 are cooperable as shown in Fig. 1. The anti-friction bearings 19, 20 which are preferably of a combined guide and thrust resisting type, are confined within the rear and front portions respectively of the casing bore, on opposite sides of the enlarged medial portion of the driven rotary member 18; and the outer race of the front bearing 20 coacts with the forward casing wall 10, while the inner bushing 26 likewise coacts with the outer race of the rear bearing 19 so as to prevent spreading of these bearings and to thus eliminate possible axial displacement of the member 18. The plug 11 which forms a part of the casing assemblage, is provided with an integral peripheral flange 28 which normally engages the end of the inner bushing 26, and which is engaged by the outer bushing 27 in order to firmly clamp the plug 11 and the bushing 26 in place; and these bushings are provided with local end notches adapted to be engaged by a spanner wrench in order to effect insertion and removal thereof.

The lower side or bottom or the casing 9 to which the pistol grip handle 12 is rigidly but detachably secured by the single bolt 13, is provided with two spaced lugs 29, 30 extending into correspondingly spaced recesses in the handle, and one of these lugs is screw threaded for the reception of the threaded bolt end. In this manner the handle 12 is prevented from turning or shifting relative to the main casing 9, and the handle may be formed of wood or plastic and should be shaped for easy and firm gripping by either hand of an operator. The upper side or top of the casing 9 to which the reciprocable element guide 14 is likewise rigidly but detachably secured by the four cap screws 15, is provided with an elongated guide slot 31 which is alined with a slot 32 in the guide 14 to permit the motion transfer pin 23 to project into the driven member groove 21, and a sealing gasket 33 is interposed between the flat surfaces of coaction of the casing 9 and guide 14.

The rotary driving member 16 which is journalled for free rotation within the bearing sleeve 17, has its outer end portion rigidly attached to a source of rotary motion such as a flexible rotating shaft 34, while its inner end is provided with a polygonal driving projection 35 which may either be formed integral with the member 16 or firmly attached thereto by a shear pin 36, as illustrated in Fig. 1. When a flexible driving shaft 34 is utilized, this rotary shaft is preferably housed within a flexible but non-rotary conduit 37 the end of which is secured within a threaded fitting 38 attached to the normally non-rotating bearing sleeve 17, but it should be noted that a small but powerful rotary electric or fluid pressure actuated motor may be direct connected to the outer end portion of the member 16 and may be mounted directly upon the outer end of the bearing sleeve 17, if so desired. In case a flexible shaft 34 and conduit 37 are employed, these parts should be of sufficient length and flexibility to permit free movement of the motion transmitting and converting unit throughout a considerable range, and the shear pin 36 serves to sever the driving connection under abnormal overload conditions.

The rotary driven member 18 shown in the drawing, is disposed within the main casing bore in axial alinement with the driving member 16, and has an integral supporting projection 39 at its forward end and a rigid central sleeve or bushing 40 projecting from its opposite end. The projection 39 coacts with the front anti-friction bearing 20, while the projecting end of the bushing sleeve 40 similarly coacts with the rear anti-friction bearing 19; and the bushing 40 which may obviously be formed integral with the driven member if so desired, is provided with an outer end socket or recess 41 having enlarged star or cross-shaped transverse cross-section adapted for endwise insertion of the driving projection 35 of the member 16 so as to provide a driving connection between the rotary members 16, 18. A helical compression spring 42 which is confined centrally within the member 18 and its central sleeve 40, has one end in direct coaction with the member 18 while its opposite end coacts with a plunger 43 which is movable by the spring 42 toward the recess 41 and is adapted to press against the driving projection 35, thus constantly tending to interrupt the driving connection between the members 16, 18 afforded by the projection 35 and recess 41.

In order to prevent such interruption and to maintain the driving connection at will, the bearing sleeve 17 in which the driving member 16 is journalled, is provided with two axially spaced annular grooves 44, 45, and the fixed closure plug 11 is also provided with two spaced latches 46, 47, as shown in Figs. 1, 2 and 3. The latches 46, 47 are spaced apart a lesser distance than the space between the grooves 44, 45, and each latch 46, 47 is pivotally suspended from the plug 11 by a pin 48 and has its latching portion constantly urged toward the sleeve 17 by means of a spring 49 and a plunger 50 as illustrated in Fig. 3. When the latch 47 is in engagement with the groove 44 as in Fig 1, the bearing sleeve 17 is positively held in such position that the driving connection will be maintained in opposition to the pressure exerted upon the end of driving projection 35 by the spring 42 and plunger 43; but when this latch 47 is released, the spring 42 will act quickly to force the projection 35 out of the recess 41, thus interrupting the driving connection and causing the sleeve 17 to slide outwardly within the plug 11 until the other latch 46 snaps into the groove 45. In order to reestablish the driving connection it is only necessary to push the bearing sleeve 17 inwardly so as to cause the driving member projection 35 to re-enter the driven member recess 41, and the groove 45 with its inclined side wall will permit this to be done without manually releasing the latch 46. The casing 9 and plug 11 by virtue of the annular formation of the grooves 44, 45, are at all times rotatably adjustable about the bearing sleeve 17, and by releasing both latches 46, 47 the sleeve 17 and driving member 16 may be freely withdrawn from the plug 11 and casing 9.

Figure 6:
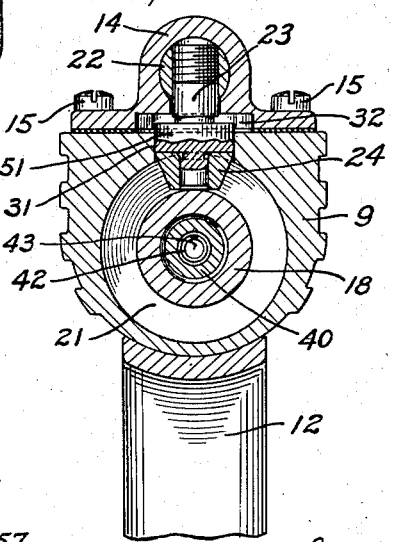
Fig. 6 is another transverse vertical section through the same unit, taken along the irregular line 6—6 of Fig. 1.

As previously indicated, the annular cam groove 21 which is formed in the enlarged medial portion of the rotary driven member 18, has tapered opposite side surfaces which are snugly cooperable with the tapered roller journalled on the projecting end of the pin 23, and the groove lies in a plane which is inclined relative to the longitudinal central axis of the casing 9. The pin 23 may be formed integral with the reciprocable tool carrying element 22, or secured thereto by screw threads as shown, and is provided with an enlarged medial guiding portion 51 slidably engaging the casing slot 31 as indicated in Figs. 1 and 6. The element 22 which is constantly reciprocable by the rotation of the member 18 due to the coaction between the groove 21, roller 24 and pin 23, is snugly but slidably confined within the guide 14; and in order to confine lubricant within the communicating chambers in which the driven member 18 and the element 22 are operable, an annular seal 52 is provided within the bushing 26 between the plug 11 and bearing 19 and an annular packing 53 is also provided between the guide 14 and element 22 near the outer end of the latter.

Figure 7:
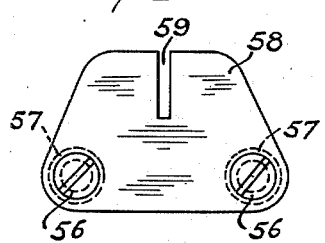
Fig. 7 is a front view of a tool guide applicable to the converter unit to guide a reciprocable tool.

The outer extremity of the reciprocable element 22 is provided with a tool or implement receiving socket 54 which is adapted to interchangeably cooperate with the correspondingly threaded shanks of various kinds of reciprocable or vibratory tools such as files, chisels, saws, or the like; and these threaded tool shanks may be provided with a lock nut engageable with the socketed end of the element 22 in order to lock the implements in desired position. When operating certain types of tools such as saws, it may be desirable to provide means carried by the casing 9 of the portable unit, for guiding the blade of the reciprocating implement, and such a guide means is shown in Figs. 1 and 7. The front wall 10 of the casing 9 is provided with spaced threaded holes 55 adapted for the reception of cap screws 56, which are cooperable with spacing tubes 57 and a guide plate 58. The tubes 57 and cap screws 56 may be of any desired length, and may if desired, be formed as cylindrical sections of suitable length each having an integral threaded projection at one end and a similarly threaded socket at its opposite end; and the plate 58 has a guide slot 59 therein with which the reciprocating blade of the tool is cooperable.

During normal operation of the improved motion converter unit, the driving member 16 may be constantly rotated from any suitable source of power and at high speed, either through a flexible drive shaft 34 confined within a flexible conduit 37, or directly by a rotary motor mounted upon the outer extremity of the bearing sleeve 17. This bearing sleeve in either case, may be inserted within the closure plug 11 and secured thereto by means of the latches 46, 47 in the manner hereinabove described, and the portable unit will then be movable in any desired direction and from place to place with the aid of the handle 12 associated with one side of the casing 9. The driving and driven members 16, 18 may be disconnected for the application of diverse types of tools to the socket 54, and when a tool has been properly secured to the reciprocable element 22, the driving connection may be established by merely pressing the sleeve 17 into the bore of the plug 11 so as to cause the latch 47 to engage the outer groove 44 as in Fig. 1, thereby causing the projection 35 to drivingly engage the socket 41 of the rotary driven member 18. Rotary motion will then be imparted from the driving member 16 to the driven member 18 and this rotary motion will cause the inclined groove 21 to revolve about the central axis of the casing 9 and will thereby impart uniform reciprocating movement to the element 22 through the roller 24 and the pin 23. This reciprocation will obviously be imparted to the tool carried by the socket 54, thus permitting work to be performed by the operator gripping the handle 12. If it becomes desirable to disconnect the power, the operator need merely release the latch 47 whereupon the spring 42 will immediately become effective to push the driving projection 35 out of the recess 41, and will cause the auxiliary latch 46 to enter the annular groove 45 so as to prevent the sleeve 17 from being driven entirely out of the bore of the plug 11. The driving power may subsequently be reapplied to the driven member 18 by merely pushing the bearing sleeve 17 inwardly, but the motion converting unit may be just as readily entirely removed from the sleeve 17 by merely manipulating both latches 46, 47 and pulling the plug 11 off of the sleeve 17. During normal operation of the improved assemblage, the portable unit may be freely rotated relative to the bearing sleeve 17 irrespective of the position of the latches 46, 47, and the chambers in which the driven member 18 and reciprocating element 22 are confined, may be filled with proper lubricant escape of which will be prevented by the seal 52 and the packing 53.

From the foregoing detailed description it will be apparent that my present invention provides an improved portable unit for converting constant rotary motion into uniform reciprocating movement and for utilizing the reciprocating motion to perform diverse types of work. The improved unit is obviously extremely simple and compact in construction besides being highly effecient in use and flexible in its adaptations, and the location of the handle 12 and the guide casing 14 on opposite sides of the casing 9 in which the members 16, 18 are rotatable, provides a well balanced construction which may be manipulated to perform work in corners and in other cramped localities. The rotary members 16, 18 may be operated either at high or low speed and have in fact been successfully operated at speeds exceeding three thousand revolutions per minute, and this rotary motion is most effectively converted into reciprocating movement of the element 22 through simple and highly efficient converting mechanism which may be maintained properly lubricated at all times so as to minimize friction losses.

The various parts of the improved assemblage may obviously be readily manufactured and assembled, and can also be quickly dismantled for inspection and removal of parts. The control latches 46, 47 are conveniently manipulable by an operator while holding the portable unit with the aid of the handle 12, and the anti-friction bearings 19, 20 will effectively prevent axial shifting of the rotary driven member 18 and will thereby insure most effective conversion of the rotary into reciprocating movement without introducing excessive lost motion. In cases where the reciprocating tool requires guiding, a guide plate 58 such as shown in Fig. 7 may be provided, and this guide plate may be disposed at any desired distance from the casing 9 by utilizing sectional supports between the plate 58 and the casing 9. While the plug 11 has been shown herein as being formed separate from the casing 9 in order to facilitate assembly and dismantling of the improved unit, these parts may obviously be formed integral with each other, and the power interrupting spring 42 may also be disposed otherwise than as shown, as long as this spring functions to quickly interrupt the motion transmission when the latch 47 is released. The improved assemblage has proven highly satisfactory in actual use for the purpose of operating various implements such as files, chisels, and saws, and may be manufactured at moderate cost while being extremely reliable in operation.

It should be understood that it is not desired to limit this invention to the exact details of construction or to the precise mode of operation herein shown and described, for various modifications within the scope of the appended claims may occur to persons skilled in the art.

I claim:

1. In a motion converter, a unitary portable and universally movable casing having a longitudinal bore sealed at one end by an integral casing wall and being screw threaded at its opposite open end, said casing having therein an elongated slot opening transversely into said bore, a driven member snugly rotatable within said bore closely adjacent to said wall and having therein an annular peripheral groove lying in a plane inclined relative to the bore axis, an anti-friction bearing for said member interposed between said wall and the adjacent member end, a motion transmitting element slidably engaging said casing slot and extending into said groove, another anti-friction bearing for said member interposed between the opposite end of said member and said bore, a retainer ring for said bearing adjustably coacting with said bore screw threads, a drive for said member detachably coacting therewith centrally of said ring, and resilient means confined within said member for detaching said drive from the member.

2. In a motion converter, a unitary portable and universally movable casing having a longitudinal bore sealed at one end by an integral casing wall and being screw threaded at its opposite open end, said casing having therein an elongated slot opening transversely into said bore, a driven member snugly rotatable within said bore closely adjacent to said wall and having therein an annular peripheral groove lying in a plane inclined relative to the bore axis, a motion transmitting element slidably engaging said casing slot and extending into said groove, a retainer ring for preventing axial displacement of said member along said bore and having screw thread coaction with the threads of the bore, a detachable driving connection for said member coacting with the latter within said ring, and a spring pressed plunger confined within said member for detaching said connection from the member.

3. In a motion converter, a unitary portable and universally movable casing having a longitudinal bore sealed at one end and being screw threaded at its opposite open end, said casing having therein an elongated slot opening transversely into said bore, a driven member snugly rotatable within said bore closely adjacent to said sealed bore end and having therein an annular peripheral tapered groove lying in a plane inclined relative to the bore axis, an anti-friction bearing for said member interposed between said wall and the adjacent member end, a motion transmitting element slidably engaging said casing slot and having a lateral projection extending into said groove, a frustro-conical roller journalled on said projection and coacting with the tapered surfaces of said groove, another anti-friction bearing for said member interposed between the opposite end of said member and said bore, a retainer ring for said bearing adjustably coacting with said bore screw threads, a drive for said member detachably coacting therewith centrally of said ring, and resilient means disposed centrally of said member for detaching said drive from the member.

4. In a motion converter, a unitary portable and universally movable casing having a longitudinal bore sealed at one end and being screw threaded at its opposite open end, said casing having therein an elongated slot opening transversely into said bore, a driven member snugly rotatable within said bore closely adjacent to said sealed bore end and having therein an annular peripheral groove lying in a plane inclined relative to the bore axis, a motion transmitting element slidably engaging said casing slot and extending into said groove, a retainer ring for preventing axial displacement of said member along said bore and having screw thread coaction with the threads of the bore, a detachable driving connection for said member coacting with the latter within said ring, and a spring pressed plunger disposed centrally of said member for detaching said connection from the member.

SIEGMUND MANDL.

REFERENCES CITED

The following references are of record in the file of this patent:

UNITED STATES PATENTS

| Number | Name | Date |
|---|---|---|
| 741,519 | Mahaffy | Oct. 13, 1903 |
| 766,970 | Pfanschmidt | Aug. 9, 1904 |
| 1,239,310 | Shepard | Sept. 4, 1917 |
| 1,351,753 | Hover | Sept. 7, 1920 |
| 1,553,456 | Metrokos | Sept. 15, 1925 |
| 1,902,662 | Phelps | Mar. 21, 1933 |
| 2,121,831 | Simmons | June 28, 1938 |
| 2,288,480 | Palumbo | June 30, 1942 |